Dec. 1, 1936.  N. M. ADAMS  2,062,489
WEASAND PRODUCT AND METHOD OF PREPARING
Original Filed May 11, 1934
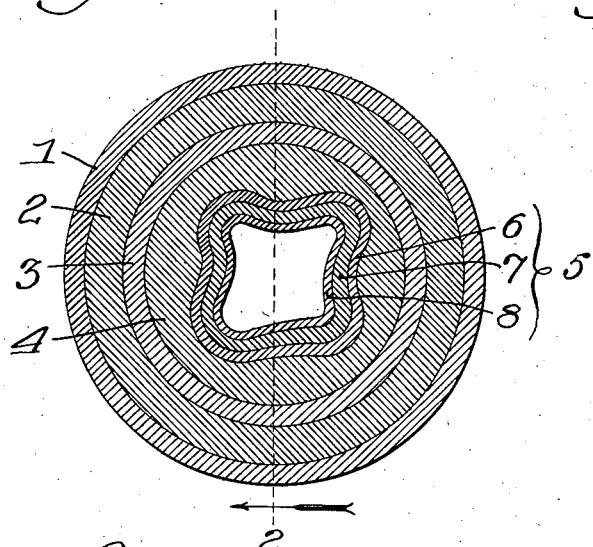
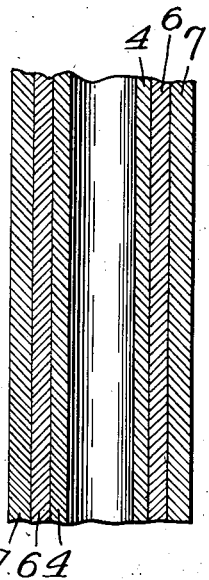
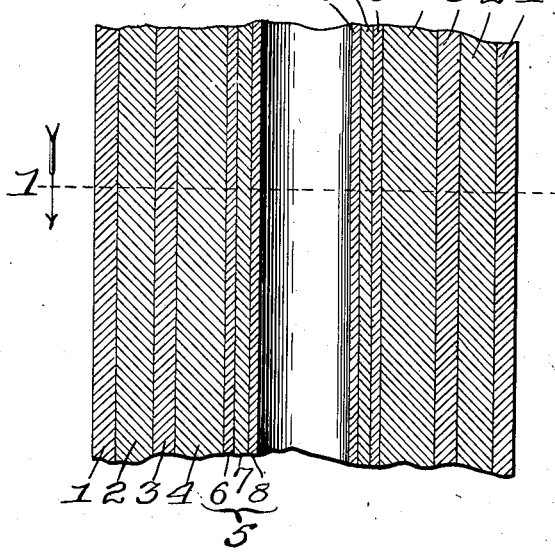
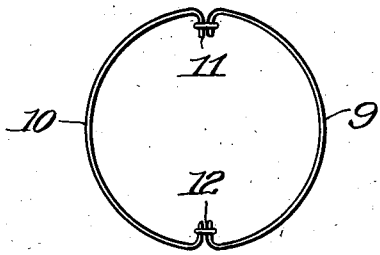
Inventor:
Nicholas M. Adams,
By Dyrenforth, Lee, Chritton & Wiles,
Attys.

Patented Dec. 1, 1936

2,062,489

UNITED STATES PATENT OFFICE 2,062,489

WEASAND PRODUCT AND METHOD OF PREPARING

Nicholas M. Adams, Chicago, Ill., assignor to Wilson & Co., Inc., a corporation of Delaware Continuation of application Serial No. 725,188, May 11, 1934. This application March 6, 1935, Serial No. 9,687

10 Claims. (Cl. 17—45)

This invention relates to a new weasand product, particularly beef weasand and a method of preparing the same.

In the present practice beef oesophaguses, which are known in the trade as weasands are cut from the animal, are cleaned with a wet brush and then stripped of connective structures holding them to the rest of the body, trimmed, scraped and turned inside out, chilled in ice water, inflated, dried and graded, and packed ready for use as sausage casings. Under this practice it is not possible to remove blood stains entirely, so that the weasand has a dark color; grubs are found between the layers of the weasand and cannot be removed, the weasand is brittle and hard and must be soaked anew when used for stuffing; and the weasands cannot be pickled or dry salted because this makes them hard and they will not soak in water. The yield of weasands under this method is also very low.

It has now been discovered that by heating the weasand for a short time within a very narrow range of temperature that the inner layer of the mucous membrane may be removed, and the remaining material may then be used as a casing or for such other purposes as desired, and is subject to none of the disadvantages of the entire weasand.

An animal weasand is illustrated diagrammatically in the drawing in which Fig. 1 represents a transverse section of the upper third of a weasand taken on line 1 of Fig. 2; Fig. 2 represents a vertical section of the upper third of the weasand; Fig. 3 shows a vertical section taken along line 2 of Fig. 1 of a stripped weasand turned inside out; and Fig. 4 is a cross section of a casing prepared by sewing together two weasands.

As shown in the drawing, the weasand comprises an outer fibrous layer 1 known as the tunica adventitia. Beneath this is a longitudinal muscular division 2, below which is a circular muscular division 3. Below the muscular layers is a layer of submucous membrane 4 and below these are three divisions which will here be collectively termed the mucous membrane 5 of the weasand. The innermost of these three is the muscularis mucosa 6 which immediately adjoins the submucous membrane. Next to this is the tunica propria or stroma 7 and on the inside is the stratified epithelium 8.

These seven divisions form four layers, the mucous membrane layer composed of the epithelium, tunica propria and muscularis mucosa; the submucous membrane layer, the muscular layer composed of the longitudinal and circular muscular divisions and the exterior fibrous layer. The mucous membrane is of a pale color and is covered with squamous stratified epithelium 8. It is loosely attached to the muscular coat by the submucosa 4 which is quite abundant. In ordinary practice layers 1, 2 and 3 are trimmed from the weasand with a knife or otherwise, and this invention deals with the treatment of the resulting product.

In accordance with this invention the epithelium layer 8 is stripped from the remaining layers of the weasand or oesophagus. In order to accomplish the removal, the animal weasand after removal from the body, cleaning, trimming and inversion, is introduced into water at a temperature between 130 and 140° F. The temperature is quite critical, inasmuch as below about 130° insufficient loosening action occurs, so that the epithelium cannot be properly stripped from the other layers. Above 140° F. the texture of the weasand weakens and the weasand shrinks. After the heat treatment the epithelium layer is simply stripped by hand from the remainder.

It has also been discovered that the pH of the cooking solution has an effect upon the color of the weasand. If the solution has a pH either quite acid or quite alkaline, the weasand produced is very white. With more neutral pH's the product tends to be darker and to have some stains. If white products are desired, it is therefore preferable to operate at high or low pH's, say below 4.5 or above 9.5. The loosening of the mucous membrane epithelium occurs better at pH's above 8 and below 5. The pH value also has an effect upon the swelling taking place in a weasand, the greatest swelling occurring above 10 and below 4 pH. The pH may be adjusted as desired by any suitable alkaline or acid medium which does not injure the weasands. Such media are well known to those skilled in the art.

Satisfactory results were obtained using a temperature of 135° F. and a pH of 4.

As an example of the invention a weasand was introduced into water at a temperature of 135° F. and having a pH 9.5. After one and a half minutes the weasand was removed and the loosened portion of the mucous membrane stripped therefrom by hand. The weasand was then put in cold weak brine and allowed to remain for twelve hours. In practice the various weasands are collected, and graded, washed, drained and salted. After curing they may be used as sausage containers. The stripped weasand may be sewn, which was not true of former weasand products.

Fig. 4 shows two weasands 9 and 10 split lengthwise and sewn together at 11 and 12 to make a sausage casing. More than two weasands may be used if desired. Where the sewed weasand is to be used as a container for articles which are to be smoked, it may be preferred to again invert the weasand, so that layer 4 is on the outside. In certain instances this may likewise be desirable on unsewed weasands.

The foregoing description has been given for clearness of understanding only, and no unnecessary limitations should be understood therefrom, but the appended claims should be construed as broadly as permissible, in view of the prior art.

This is a continuation of my co-pending application Serial Number 725,188, filed May 11, 1934.

I claim:

1. The method of preparing a stripped weasand product, which comprises treating beef weasands to loosen a portion of the mucous membrane layer, stripping the loosened portion therefrom, and curing said stripped weasand.

2. The method of preparing a weasand product, which comprises immersing a beef weasand for a short period in water at a temperature of 130 to 140° F., whereby the epithelium layer thereof is loosened, and stripping said layer from the weasand.

3. The method as set forth in claim 2, in which the period in the water is two minutes.

4. The method as set forth in claim 2, in which the pH of the solution is not neutral.

5. The method as set forth in claim 2, in which the water is at a temperature of 135° F. and a pH of 9.5.

6. The method as set forth in claim 2, in which the water is at a temperature of 135° F. and a pH of 4.

7. A weasand product, having the property of softening in water after pickling in salt, comprising the submucous membrane, the muscularis mucosa and the stroma of a beef weasand, from which the epithelium has been removed.

8. A sausage casing comprising a plurality of longitudinally split weasands sewn together at the edges, said weasands having the property of softening in water after pickling in salt, and having the epithelium, tunica and muscular divisions removed.

9. A casing as set forth in claim 8, in which the submucous membrane of the weasand is on the outside.

10. A stripped weasand product comprising the cured submucous membrane, muscularis mucosa and stroma of a beef weasand.

NICHOLAS M. ADAMS.